Sept. 3, 1940.  H. F. SEIP  2,213,535
TIRE CHANGING STAND
Filed Sept. 26, 1938  2 Sheets-Sheet 1
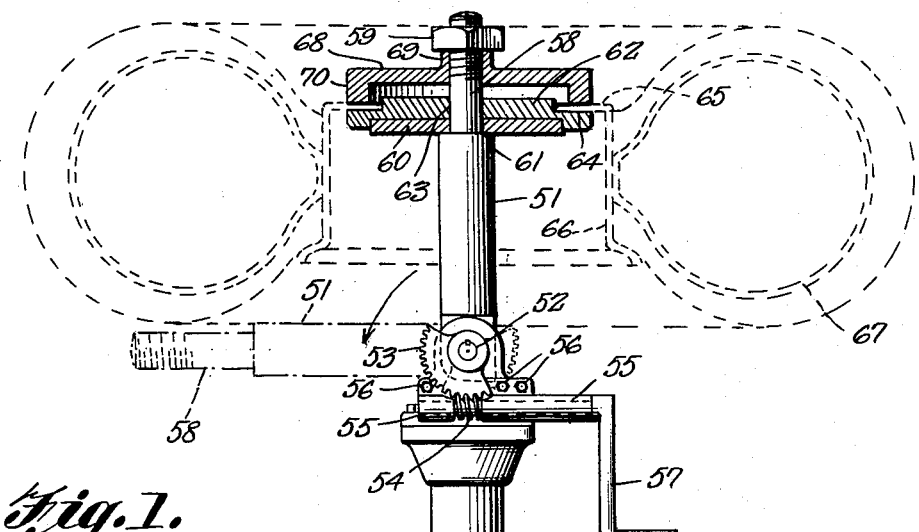
Fig. 1.
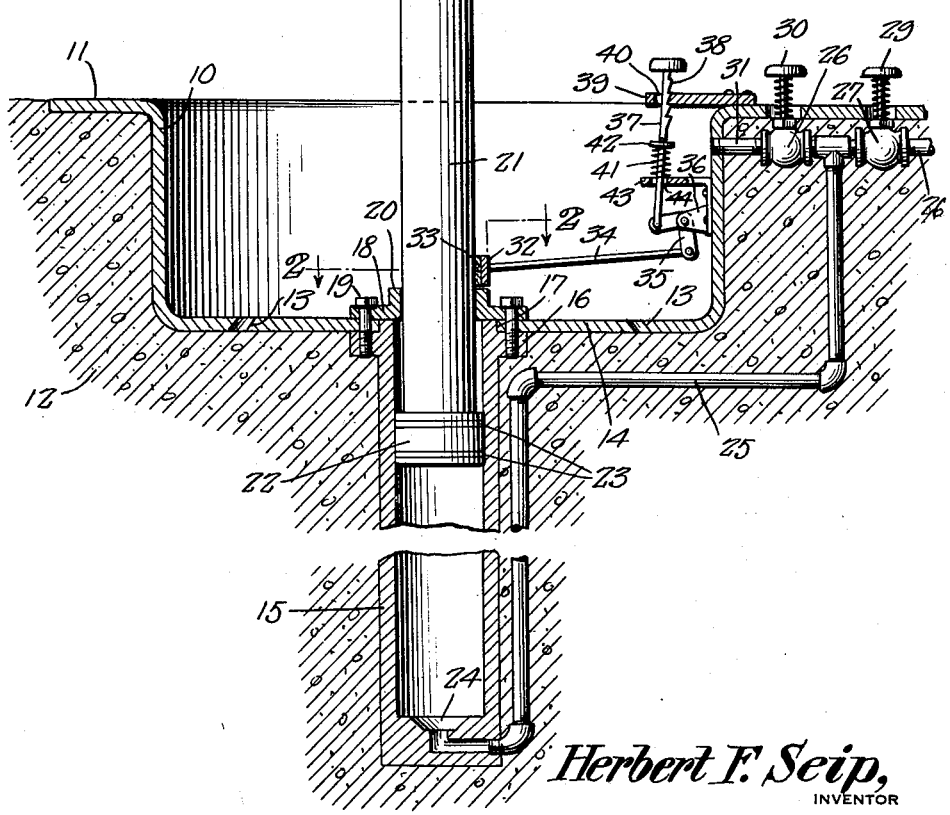
Herbert F. Seip,
INVENTOR
BY Victor J. Evans & Co.
ATTORNEYS
WITNESS Sept. 3, 1940.  H. F. SEIP  2,213,535
TIRE CHANGING STAND
Filed Sept. 26, 1938  2 Sheets-Sheet 2
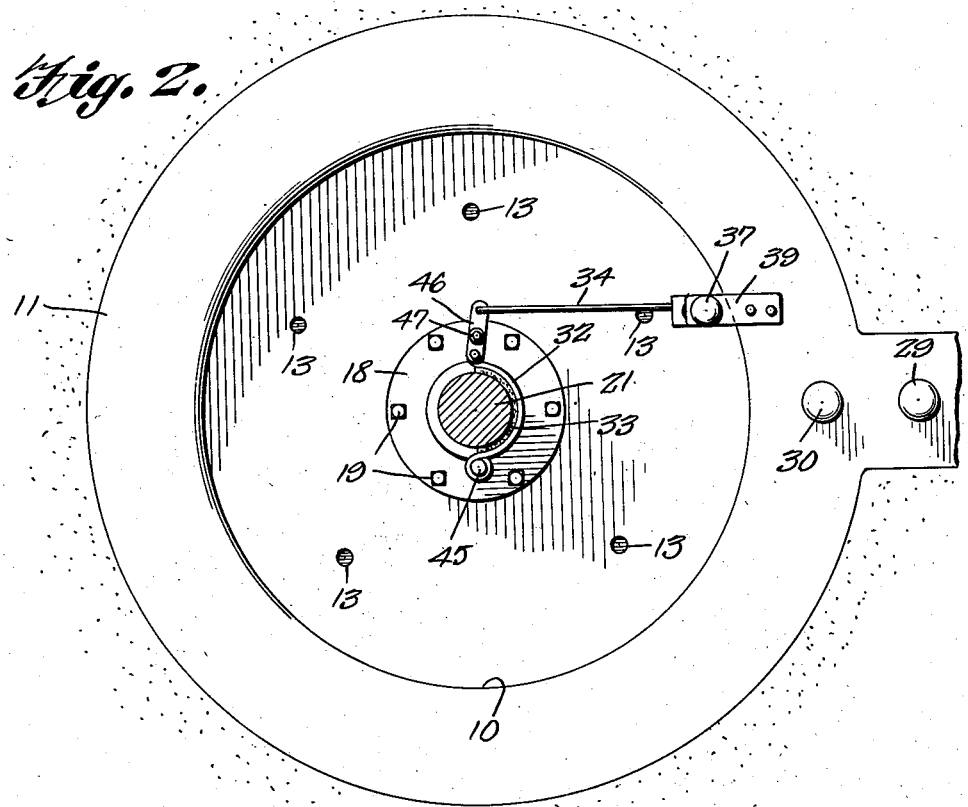
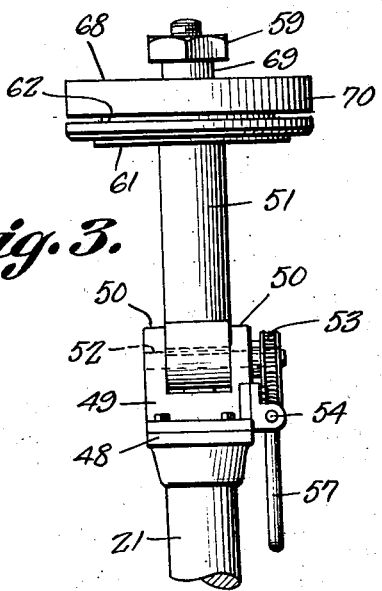
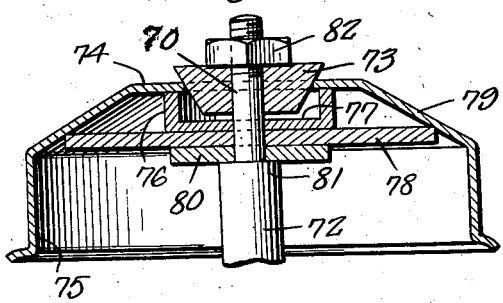
Herbert F. Seip, INVENTOR
BY Victor J. Evans & Co.
ATTORNEYS
P. A. Hickey
WITNESS Patented Sept. 3, 1940

2,213,535

UNITED STATES PATENT OFFICE 2,213,535

TIRE CHANGING STAND

Herbert F. Seip, Waltham, Mass.

Application September 26, 1938, Serial No. 231,810

1 Claim. (Cl. 144—288)

This invention relates to tire changing stands and has for an object to provide a simplified form of pneumatic jack having novel means for supporting a wheel in various angular positions from the vertical to the horizontal while work is being done upon the tire, the device being particularly well adapted for use in connection with large heavy truck wheels which ordinarily cannot be expeditiously handled by similar devices now in use.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a longitudinal sectional view of a tire changing stand constructed in accordance with the invention.

Figure 2 is a cross sectional view of the stand taken on the line 2—2 of Figure 1 and showing the lower casing and pneumatic controls in top plan.

Figure 3 is a detail side elevation of the parts for supporting the wheel in various adjusted positions.

Figure 4 is a detail sectional view of a modified form of clamp for engaging the wheel.

Referring now to the drawings in which like characters of reference designate similar parts in the various views, 10 designates a substantially cylindrical casing having a flange 11 at the top and adapted to be sunk into the ground or other support 12. Drain openings 13 are formed in the bottom 14 of the casing.

A pneumatic cylinder 15 extends downwardly from the center of the bottom of the casing and is equipped at the top with a flange 16 adapted to engage the marginal portions of an opening 17 formed centrally in the bottom 14 of the casing. A clamp ring 18 is bolted as shown at 19 to the flange 16 and is provided with an upstanding guide flange 20 which slidably receives a pneumatic piston 21.

The pneumatic piston forms a standard for supporting a vehicle wheel and is provided with a head 22 having rings 23 to seal the piston pressure tight against the wall of the cylinder 15. Compressed air is let into the cylinder against the bottom face of the piston through a port 24 formed in the bottom of the cylinder 15 and connected through the medium of a pipe 25 to a compressed air supply pipe 26. The pipe 25 extends upwardly along the cylinder 15 and along the exterior of the casing 10 so as not to interfere with the working parts of the device. The air supply pipe is equipped on opposite sides of the intake end of the pipe 25 with an air inlet valve 27 and an air outlet valve 28 having respective spring pressed stems 29 and 30 normally holding the valves closed and adapted to be depressed selectively by the operator's foot to let compressed air into the cylinder 15 or to vent air from the cylinder 15 to respectively raise or lower the piston 21. An outlet pipe 31 is connected to the outlet valve 28 and opens through the wall of the casing 10 into the casing.

A brake shoe 32 is equipped with a brake band 33 adapted to frictionally engage the piston 21 and hold the piston stationary against rotation on its axis. The brake shoe is equipped with a link 34 the outer end of which is connected to a bell crank lever 35 which is pivotally mounted on a bracket 36 which is secured to the inner face of the vertical wall of the casing 10. A push rod 37 is connected at the lower end to the bell crank lever and is formed on one side with teeth 38 adapted to engage with a stop plate 39 which is secured to the flange 11 of the casing. The stop plate is provided with a slot 40 of sufficient length to permit the push rod being rocked outwardly to disengage the teeth from the stop plate. A helical spring 41 is sleeved on the push rod and bears at the upper end against a collar 42 secured to the push rod, and at the lower end against a bracket 43 which is secured to the vertical wall of the casing 10 and is provided with an opening 44 which slidably receives the push rod.

For mounting the brake shoe a pin 45, best shown in Figure 2, is secured to the clamp ring 18 and one end of the shoe is pivotally mounted upon the pin. The opposite end of the shoe is pivotally secured to a lever 46 which is pivoted intermediate the ends upon a pivot pin 47 which rises from the clamp ring diametrically opposite the pivot pin 45. The free end of the link is connected to the above mentioned push rod.

To release the brake shoe the operator depresses push rod against the tension of the spring 41 until one of the teeth 38 hooks over the stop plate 39, whereupon air may be admitted to the cylinder to elevate the piston 21. The operator may now depress the push rod and move it to the outer end of the slot 40 then release it to permit the spring 41 to expand and rock the bell crank lever 45 and apply the brake to prevent rotation of the piston. However, the push rod may be depressed at any time during the work upon the tire to release the brake and permit the piston to be rotated axially.

Referring now to Figures 1 and 3 it will be seen that the piston 21 terminates at the upper end in a disc head 48 upon which is bolted a bracket 49 having upstanding spaced hinge ears 50. An arm 51 is received at the lower end between the hinge ears and a pivot shaft 52 is keyed to the arm and rotatably mounted on the hinge ears. One end of the shaft projects beyond one of the hinge ears and is equipped with a segment gear 53 which engages a worm pinion 54 which is mounted at the ends in bearings 55 which are bolted to the last named hinge ear as shown at 56. The end of the worm pinion is provided with a crank handle 57 through the medium of which the worm pinion may be turned to turn the segment gear and move the arm 51 through an arc of 90 degrees to any adjusted position from the horizontal to the vertical in order to dispose a heavy truck wheel or the like for convenience in working upon the tire or applying or removing the wheel.

The upper end of the arm 51 is uniformly reduced to provide a stem 58 which is exteriorly threaded to receive a nut 59. A washer 60 is disposed on the shoulder 61 at the base of the reduced stem 58 and a bottom clamp plate 62 is supported upon the washer 60. The clamp plate is provided with a central opening 63 to receive the stem and is provided with a recess 64 at the peripheral edge to receive the face plate 65 of the rim 66 of a tire 67. A top clamp plate 68 is provided with a centrally disposed guide tube 69 to slidably fit the stem 58 and is provided with a downwardly extending flange 70 adapted to engage the top face of the face plate 65 and clamp the rim and tire to the arm 51 when the clamp nut 59 is tightened.

In Figure 4 there is shown a modified form of wheel clamping means. The reduced stem 70 of the wheel supporting arm 72 has mounted therein an annular wedge 73 which may be tightened against the face plate 74 of a tire rim 75 to clamp the same against the flange 76 of a lower clamp plate 77. The clamp plate is supported upon a disc 78 which extends outwardly beyond the clamp plate and engages the inclined portion 79 of the rim and supports part of the weight of the wheel. The disc is supported upon a washer 80 which engages the shoulder 81 at the base of the reduced end 70. A clamp nut 82 is threaded upon the upper end of the stem and when tightened wedges the annular wedge 73 tightly against the face plate 74 to hold the wheel in place while work is being performed upon the tire.

The wheel supporting parts of the device, above the piston, have been found in practice to permit of a heavy duty wheel being applied while the arm is in the horizontal position shown by dotted lines in Figure 1 and also will permit the wheel to be removed from the arm and rolled away after the tire has been repaired. To promote repairing on the tire the arm 51 may be moved to any desired inclined position and also by releasing the brake the piston 21 may be rotated to present any desired portion of the tire to the operator during the course of the work upon the tire.

Since the operation of the device has been described as a description of the parts progressed it is thought that the invention will be fully understood without further explanation.

What is claimed is:

A tire changing stand comprising a standard terminating at the upper end in a disk head, a bracket secured to the head having upstanding spaced hinge ears, an arm received at the lower end between the hinge ears, a pivot shaft passing through the arm and hinge ears and fixed to the arm, one end of the shaft projecting beyond one of the hinge ears, a segment gear fixed to the projecting end of the shaft, tubular bearings secured to the last-named hinge ear and extending in alignment on said disk head, a worm pinion rotatably mounted in the bearings and having a portion exposed between the bearings meshing with the segment gear, a crank handle on one end of the worm pinion through the medium of which the worm pinion may be turned to turn the segment gear and move the arm through an arc of ninety degrees to any adjusted position from the horizontal to the vertical, and means for clamping the face plate of a heavy duty truck wheel, or the like, to the upper end of the arm.

HERBERT F. SEIP.